(12) United States Patent
Foster et al.

(10) Patent No.: US 12,454,898 B2
(45) Date of Patent: Oct. 28, 2025

(54) ELECTRIC CAMSHAFT PHASER ASSEMBLY INCLUDING A FLEXIBLE GEAR WITH A RETAINER

(71) Applicant: Schaeffler Technologies AG & Co. KG, Herzogenaurach (DE)

(72) Inventors: Colin Foster, Belle River (CA); Steven Burke, Fort Gratiot Township, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/629,350

(22) Filed: Apr. 8, 2024

(65) Prior Publication Data

US 2025/0314183 A1    Oct. 9, 2025

(51) Int. Cl.
*F01L 1/344*    (2006.01)
(52) U.S. Cl.
CPC .................................... *F01L 1/344* (2013.01)
(58) Field of Classification Search
CPC ........................................................ F01L 1/344
See application file for complete search history.

(56) References Cited

FOREIGN PATENT DOCUMENTS

| DE | 10045054 A1 | * | 4/2001 | ............... F01L 9/24 |
| DE | 102016220944 A1 | * | 4/2018 | ........... F16H 49/001 |
| DE | 102016222835 A1 | * | 5/2018 | ........... F16H 49/001 |
| WO | WO-2005080757 A1 | * | 9/2005 | ............... F01L 1/34 |

* cited by examiner

Primary Examiner — Ngoc T Nguyen
(74) Attorney, Agent, or Firm — Davidson Kappel LLC (57) ABSTRACT

A camshaft phaser assembly configured for phasing a camshaft and a crankshaft with respect to each other is provided. The camshaft phaser assembly includes a sprocket for receiving torque from the crankshaft; an output gear for driving the camshaft; a flexible gear deformable into an elliptical orientation for engaging the output gear to transmit torque from the sprocket to the output gear; and a wave generator for deforming the flexible gear into the elliptical orientation; the flexible gear radially disposed about the wave generator and including an inner circumferential surface in contact with an outer race of the wave generator, the flexible gear including teeth for engaging the output gear in the elliptical orientation and a retainer at an axial end of the flexible gear, the output gear including a centering feature configured for contacting the retainer to center the flexible gear in the elliptical orientation inside of the output gear.

20 Claims, 6 Drawing Sheets

ELECTRIC CAMSHAFT PHASER ASSEMBLY INCLUDING A FLEXIBLE GEAR WITH A RETAINER

TECHNICAL FIELD

The present disclosure relates to camshaft phaser assemblies, and more specifically to electric camshaft phaser assemblies including wave generators.

BACKGROUND

Electric camshaft phaser assemblies including wave generators are known.

SUMMARY

A camshaft phaser assembly configured for phasing a camshaft and a crankshaft with respect to each other is provided. The camshaft phaser assembly includes a sprocket for receiving torque from the crankshaft; an output gear for driving the camshaft; a flexible gear deformable into an elliptical orientation for engaging the output gear to transmit torque from the sprocket to the output gear; and a wave generator for deforming the flexible gear into the elliptical orientation; the flexible gear radially disposed about the wave generator and including an inner circumferential surface in contact with an outer race of the wave generator, the flexible gear including teeth for engaging the output gear in the elliptical orientation and a retainer at an axial end of the flexible gear, the output gear including a centering feature configured for contacting the retainer to center the flexible gear in the elliptical orientation inside of the output gear.

In examples, the flexible gear includes a cylindrical section including the teeth and the retainer.

In examples, the retainer forms a rim of a first end of the cylindrical section

In examples, the flexible gear further includes a disc section at a second end of the cylindrical section extending radially away from the cylindrical section.

In examples, the centering feature is defined by walls of a groove formed in the output gear.

In examples, the groove is defined by an axially extending inner circumferential surface, an axially extending outer circumferential surface and a radially extending surface extending from the inner circumferential surface to the outer circumferential surface.

In examples, an axial edge of the retainer directly faces the radially extending surface of the groove.

In examples, the flexible gear is configured such that, in the elliptical orientation, two portions of the outer circumferential surface of the retainer contact the outer circumferential surface of the groove and two portions of the inner circumferential surface of the retainer contact the inner circumferential surface of the groove.

In examples, the inner circumferential surface and the outer circumferential surface taper radially away from each other while extending axially away from the radially extending surface.

In examples, the output gear includes a cylindrical section including a plurality of teeth on an inner circumferential surface thereof, some of the teeth of the output gear engaging some of the teeth of the flexible gear in the elliptical orientation.

In examples, the output gear includes a disc section extending radially inward from the cylindrical section, the centering feature being on the disc section.

In examples, the centering feature is a groove is formed in a radially outer extent of the disc section.

In examples, the retainer is ring-shaped.

A method of constructing a camshaft phaser assembly configured for phasing a camshaft and a crankshaft with respect to each other is also provided. The method includes coupling an output gear to a sprocket; installing a flexible gear inside of the output gear with teeth of the flexible gear received inside of teeth of the output gear; and installing a wave generator inside of the output gear, the flexible gear being deformable by the wave generator into an elliptical orientation in which some of the teeth of the flexible gear engage some of the teeth of the output gear to transmit torque from the sprocket to the output gear, the flexible gear including a retainer extending axially away from the teeth, the installing of the flexible gear inside of the output gear including inserting a retainer defining a first axial end of the flexible gear into a centering feature of the output gear to center the flexible gear inside of the output gear.

In examples, the coupling of the output gear to the sprocket includes inserting the output gear inside of the sprocket, the output gear configured for being connected to the camshaft.

In examples, method further includes non-rotatably connecting the flexible gear to the sprocket.

In examples, the flexible gear includes a cylindrical section including the teeth and the retainer, and a disc section at a second axial end of the cylindrical section extending radially away from the cylindrical section, the non-rotatably connecting of the flexible gear to the output gear including fastening the disc section to the sprocket.

In examples, the centering feature is a groove formed in a radially extending surface of the output gear, the groove being defined by an axially extending inner circumferential surface, an axially extending outer circumferential surface and a radially extending surface extending from the inner circumferential surface to the outer circumferential surface, the inserting of the retainer into the centering feature including moving the retainer toward the radially extending surface defining the groove.

In examples, the flexible gear includes a cylindrical section including the teeth and the retainer, and a disc section at a second end of the cylindrical section extending radially away from the cylindrical section, wherein the output gear includes a cylindrical section including the teeth on an inner circumferential surface thereof, and a disc section extending radially inward from the cylindrical section, the centering feature being on the disc section, the installing of the flexible gear inside of the output gear including installing the cylindrical section of the flexible inside of the cylindrical section of the output gear.

In examples, the centering feature is a groove formed in a radially outer extent of the disc section.

BRIEF DESCRIPTION OF THE DRAWINGS

The present disclosure is described below by reference to the following drawings, in which:

FIG. 1b shows a radially facing cross-sectional view of the electric camshaft phaser assembly show in FIG. 1a;

DETAILED DESCRIPTION

Figure 1A:
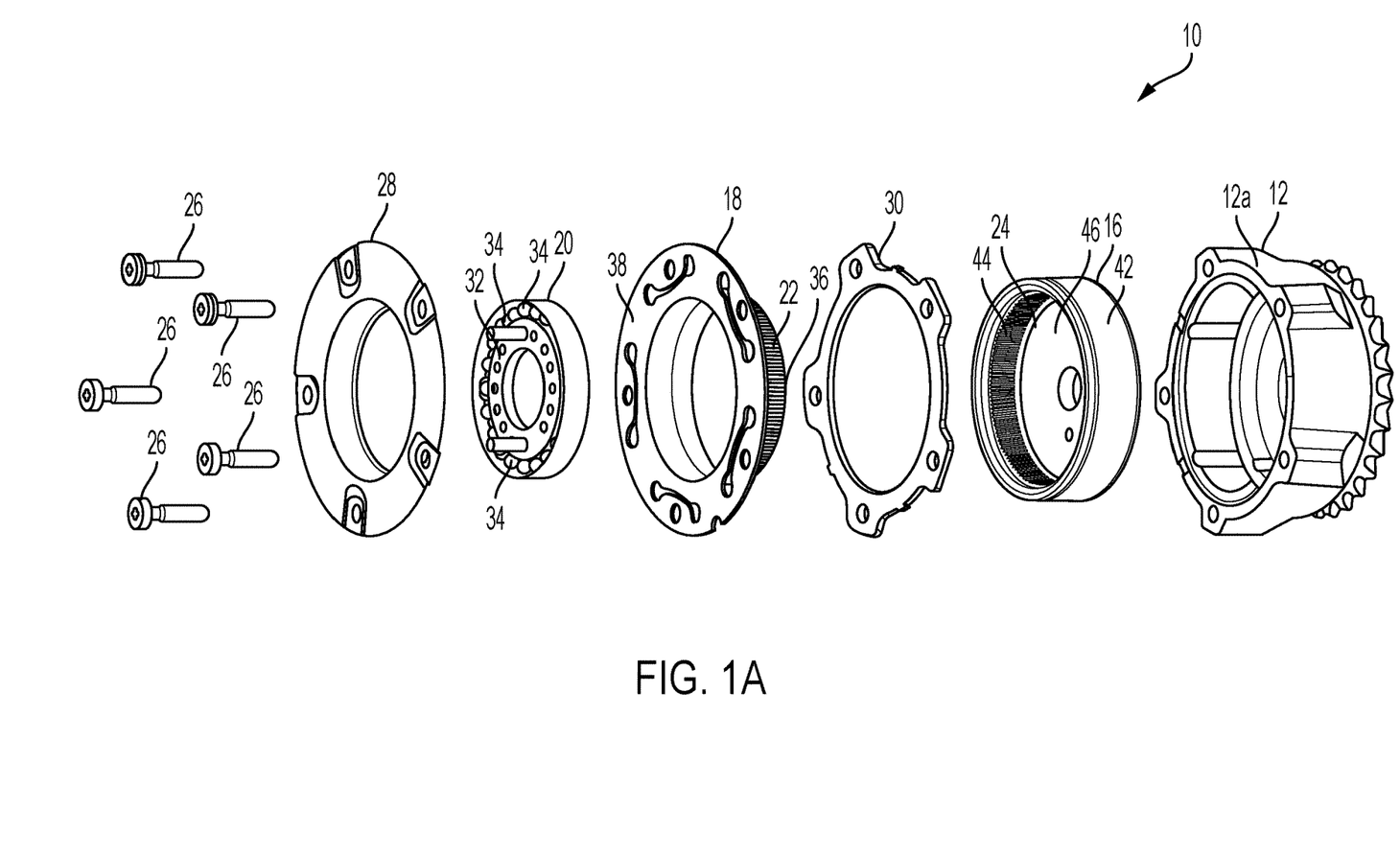
FIG. 1a shows an exploded view of an electric camshaft phaser assembly.
Figure 1B:
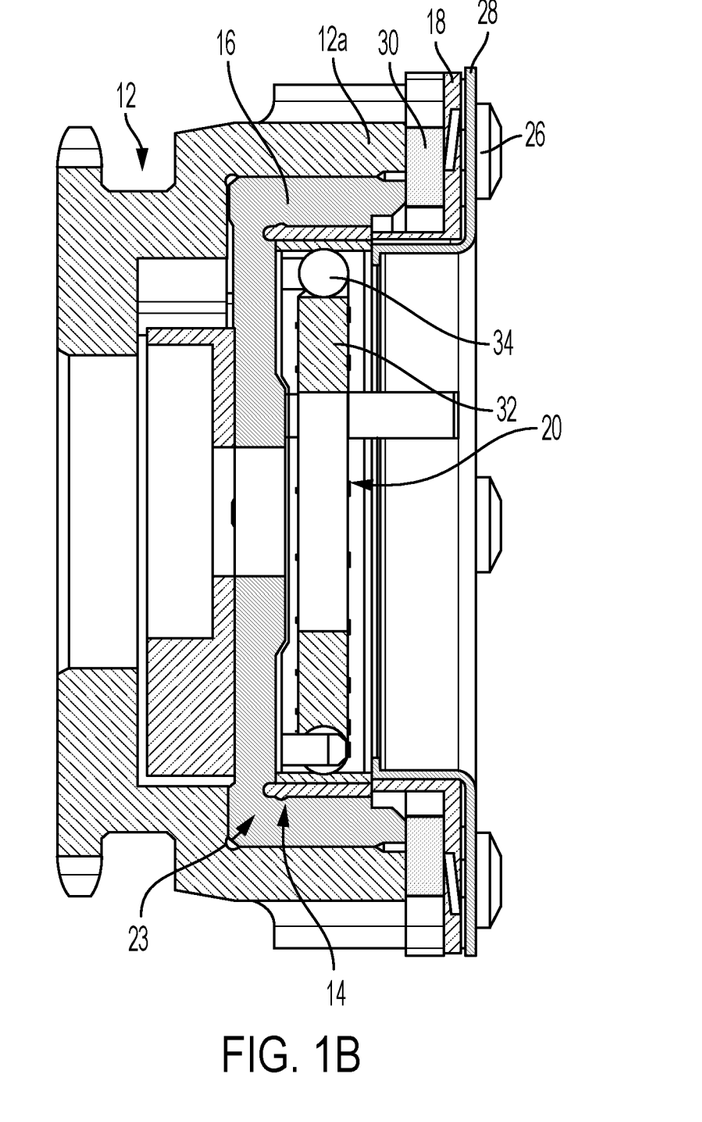

FIG. 1a shows an exploded view of an electric camshaft phaser assembly 10 and FIG. 1b shows a radially facing cross-sectional view of electric camshaft phaser assembly 10. Electric camshaft phaser assembly 10 includes a sprocket 12 for receiving torque from a crankshaft, an output gear 16 for driving a camshaft, a flexible gear 18 and a wave generator 20. The flexible gear 18 is deformable into an elliptical orientation for engaging the output gear 16. The wave generator 20 is configured for deforming the flexible gear 18 into the elliptical orientation. The flexible gear 18 is radially disposed about the wave generator 20 and includes an inner circumferential surface in contact with the wave generator 20. The flexible gear 18 includes teeth 22 for engaging the output gear 16 in the elliptical orientation and a retainer 14 at an axial end of the flexible gear 18, which is formed as a single piece with the flexible gear 18 in the example shown in the drawings. The output gear 16 including a centering feature 23 configured for contacting the retainer 14 to center the flexible gear 18 in the elliptical orientation inside of the output gear 16. In the examples shown in FIGS. 1a and 1b, centering feature 23 is formed by a groove 24 formed in the output gear 16 for receiving retainer 14 to center the flexible gear 18 inside of the output gear 16.

The flexible gear 18 is non-rotatably connected by a plurality of fasteners 26 to the sprocket 12. The fasteners 26 can be bolts or screws. Fasteners 26 also secure a wave generator cover 28 and a spacer ring 30 to sprocket 12.

Figure 2A:
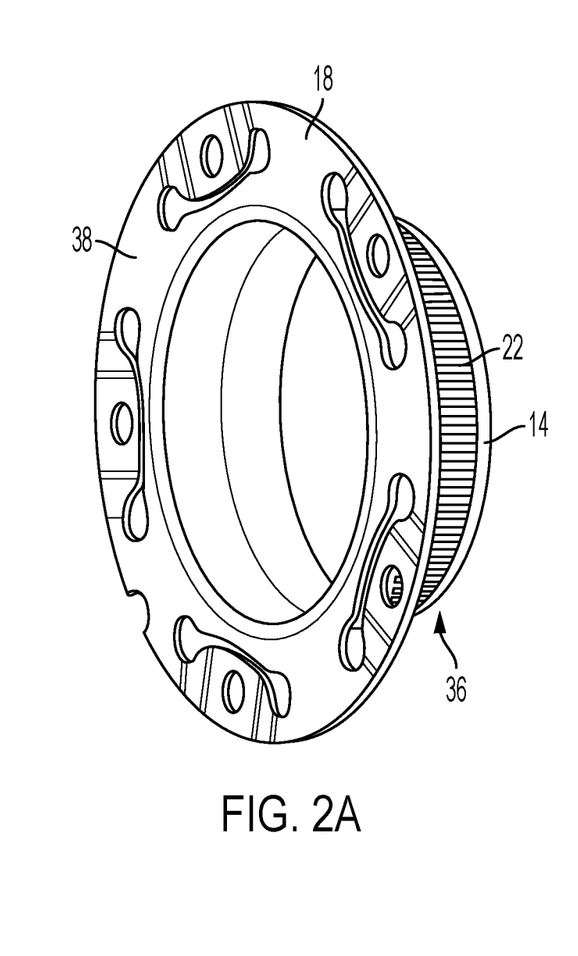
FIG. 2a and FIG. 2b show perspective views of a flexible gear of the electric camshaft phaser assembly shown in FIGS. 1a and 1b.
Figure 2B:
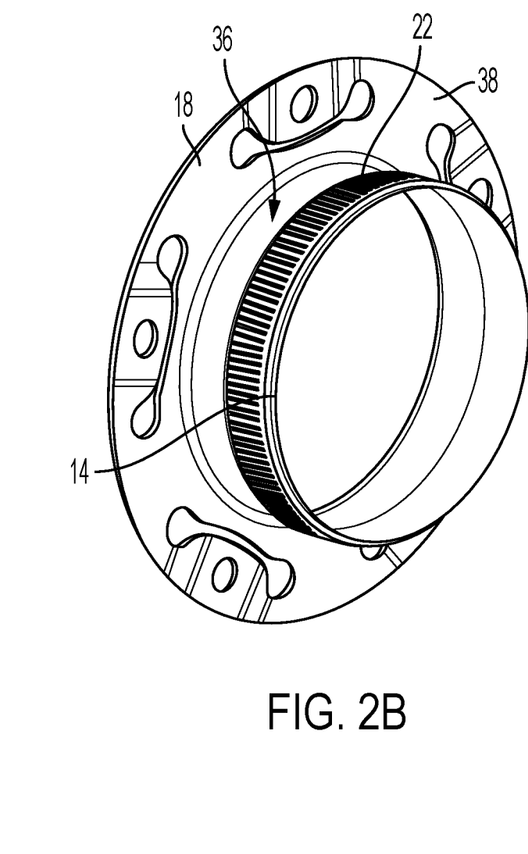

FIGS. 2a and 2b show perspective views of the flexible gear 18, which has a cylindrical section 36 that includes the teeth 22 and the retainer 14, which is formed by a rim of cylindrical section 36 at a first axial end of the cylindrical section 36. The retainer 14 is ring-shaped. The flexible gear 18 further includes a disc section 38 at a second axial end of the cylindrical section 36. The flexible gear 18 is non-rotatably connected to the output gear 16 by fastening the disc section 38 to the end of a cup-shaped section 12a of the sprocket 12. Specifically, fasteners 26 pass through holes in disc section 38 and into threaded holes in cup-shaped section 12a to fasten flexible gear 18 to sprocket 12.

Figure 3A:
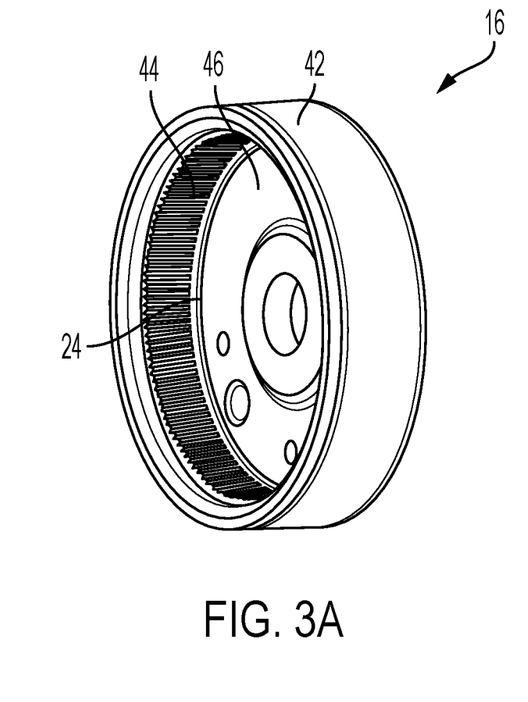
FIGS. 3a and 3b show perspective views of the output gear of the electric camshaft phaser shown in FIGS. 1a and 1b.
Figure 3B:
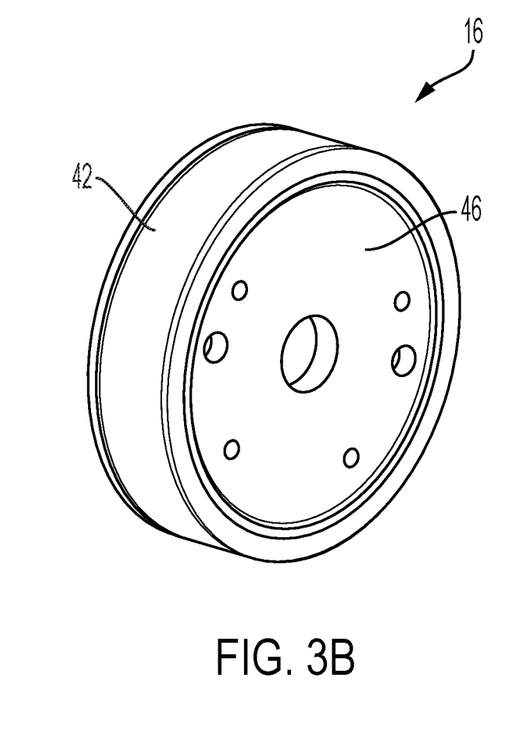

FIG. 3a and FIG. 3b show perspective view of the output gear 16, which has a cylindrical section 42 including a plurality of teeth 44 on an inner circumferential surface thereof. As explained further with respect to FIGS. 5a and 5b, some of the teeth 44 of the output gear 16 engage some of the teeth of the flexible gear 18 when the flexible gear 18 is in the elliptical orientation. The output gear 16 further includes a disc section 46 extending radially inward from the cylindrical section 42. The disc section 46 is configured for being non-rotatably connected to the camshaft by for example a bolt being received in the center hole defined by disc section 46. The centering feature 23 is on the disc section 46. More specifically, the groove 24 is formed in a radially outer extent of the disc section 46.

Figure 4A:
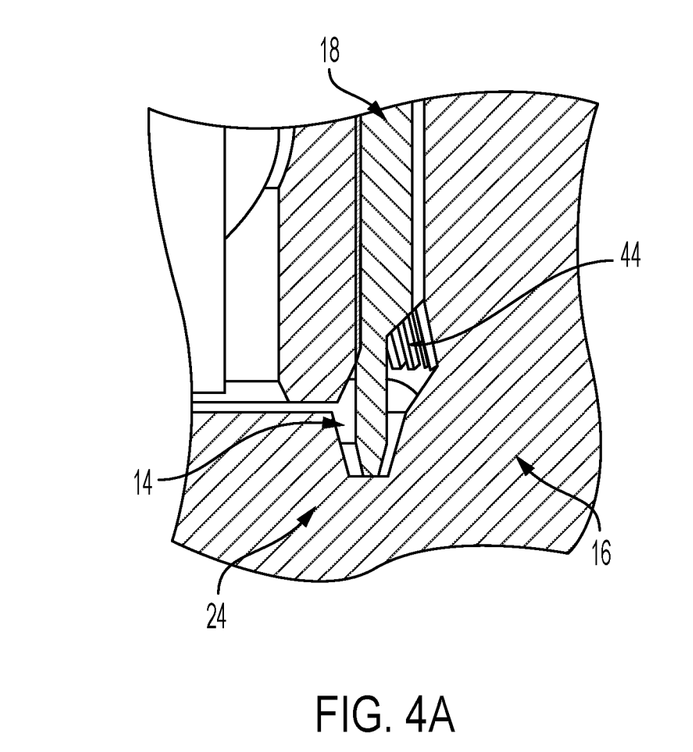
FIG. 4a and FIG. 4b show enlarged cross-sectional views of the electric camshaft phaser assembly shown in FIGS. 1a and 1b illustrating the retainer of the flexible gear and a centering feature of an output gear.
Figure 4B:
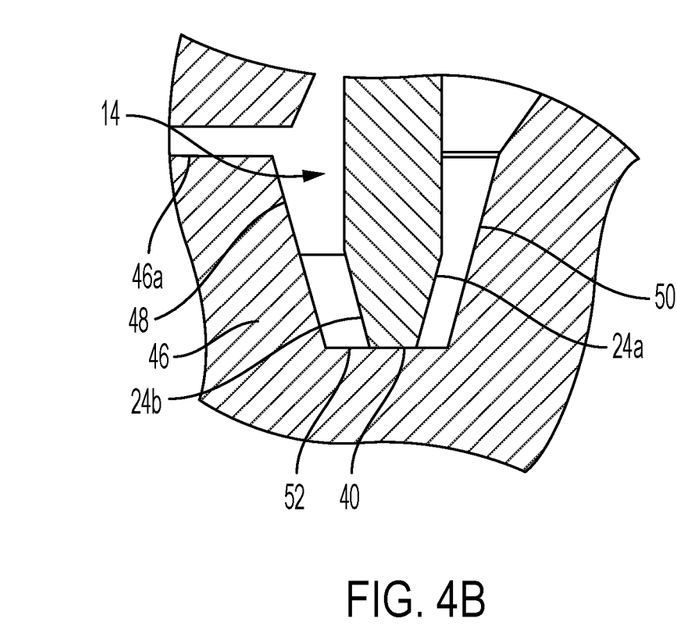

FIG. 4a and FIG. 4b show enlarged cross-sectional views of camshaft phaser assembly 10 illustrating the centering feature 23 and groove 24. More specifically, FIGS. 4a and 4b show the retainer 14 and centering feature 23 in the form of groove 24, illustrating the shape of groove 24 and retainer 14. Groove 24 is formed in a radially extending surface 46a of disc section 46 and the retainer 14 is received in groove 24. In the example of FIGS. 4a, 4b, the axial end of retainer 14 is chamfered. In other examples, the axial end can be rounded or any other suitable shape for insertion into the groove 24.

Centering feature 23 includes an inner circumferential surface 48 configured for limiting radially inward movement of the retainer 14 and an outer circumferential surface 50 configured for limiting radially outward movement of the retainer 14.

More specifically, the groove 24 forming centering feature 23 is defined by an inner circumferential wall of the groove 24 forming an inner circumferential surface 48 extending axially from radially extending surface 46a, an outer circumferential wall of the groove 24 forming an outer circumferential surface 50 extending axially from radially extending surface 46a and a radially extending wall of the groove 24 forming an a radially extending surface 52 extending from the inner circumferential surface 48 to the outer circumferential surface 50. An axial edge 40 of the retainer 14 directly faces the radially extending surface 52 of groove 24. The inner circumferential surface 48 and the outer circumferential surface 50 taper radially away from each other while extending axially away from the radially extending surface 52.

The wave generator 20 is configured to translate a rotational motion from an electric motor to the flexible gear 18 to change respective radial distances of a plurality of points on the outer circumference of the flexible gear 18 with respect to an axis of rotation for the flexible gear 18 and to urge only a respective portion of the plurality of teeth 22, and not all of the teeth, into contact with the one of the output gear 16. The wave generator 20 further includes a rotor 32 and a plurality of balls 34 facilitating rotation of the rotor 32 with respect to an outer race as shown in FIG. 1.

Figure 5A:
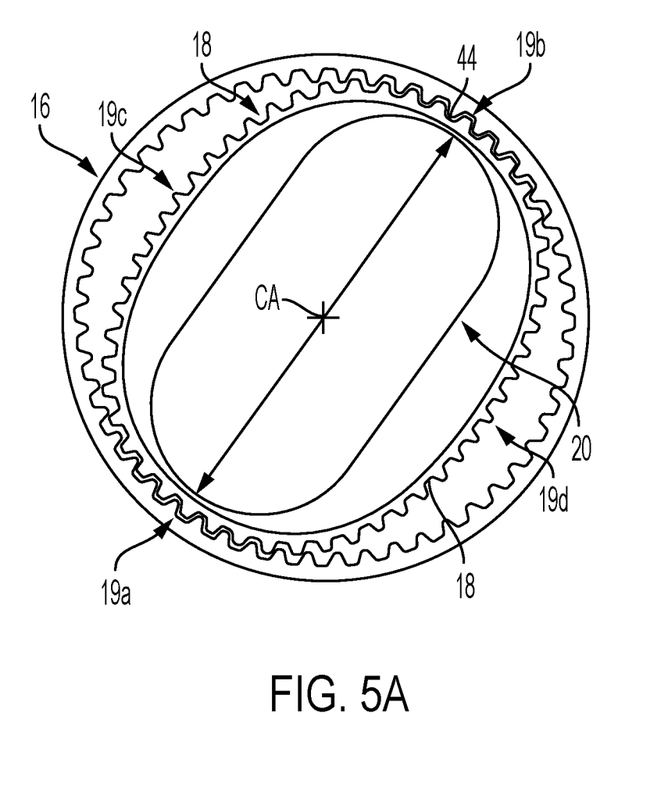
FIGS. 5a and 5b show schematic cross-sectional views illustrating a wave generator forcing the flexible gear into an elliptical orientation in two different rotational orientations.
Figure 5B:
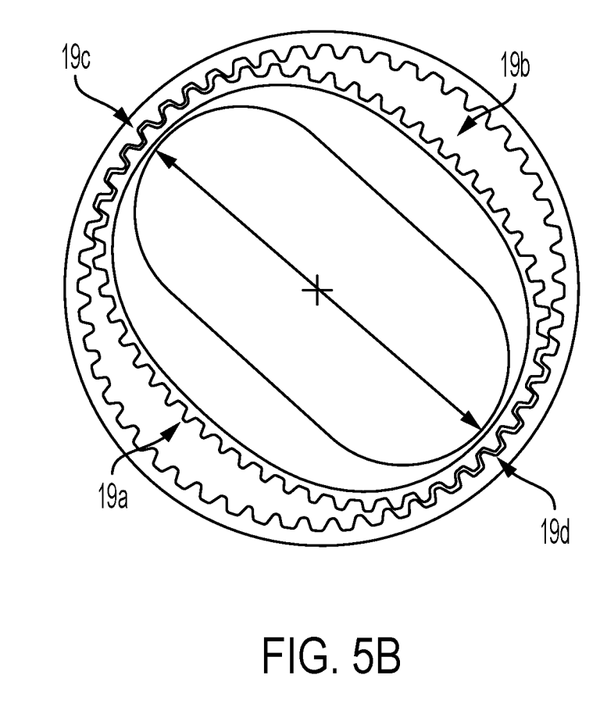

More specifically, as schematically shown in FIG. 5a and FIG. 5b (which overemphasizes the elliptical orientation and shape of wave generator 20 for illustrative purposes), the rotation of the wave generator about axis of rotation CA and with respect to the flexible gear 18 changes respective radial distances of a plurality of points on the outer circumference of cylindrical section 36 of the flexible gear 18 with respect to an axis of rotation for flexible gear 18. The contact of the wave generator 20 with the flexible gear 18 urges only respective portions of flexible gear 18 radially outward and forces the drive teeth 22 of said portions, and not all of teeth 22, into contact with output gear 16 at any point in time. The rotation of the wave generator 20 and the engagement of flexible gear 18 with output gear 16 controls phasing of the camshaft with respect to the crankshaft.

In FIG. 5a, portions 19a and 19a of flexible gear 18 are maximally extended in a radial direction, orthogonal to axis CA, by contact between the inner circumferential surface of flexible gear 18 and the outer race of the wave generator 20, causing teeth 22 on portions 19A and 19B to engage teeth 44 of output gear 16. Portions 19c and 19d of flexible gear 18 are spaced away from teeth 44 of the output gear 16. Portions 19a, 19b are each 90 degrees from portions 19c, 19d with respect to the center axis CA. The rotation of wave generator 20 with respect to flexible gear 18 changes which teeth 22 of flexible gear 18 engage teeth 44 of output gear

16. In FIG. 5b, after the wave generator 20 has been rotated in comparison to FIG. 5a, portions 19c and 19d of flexible gear 18 are maximally extended in a radial direction, orthogonal to axis CA, by contact between the inner circumferential surface of flexible gear 18 and the outer race of the wave generator 20, causing teeth 22 on portions 19C and 19D to engage teeth 44 of output gear 16. Portions 19A and 19B of the outer circumference 19 of flexible gear 18 are spaced away from teeth 44 of the output gear 16.

As wave generator 20 is rotated, and the teeth 22 engaging teeth 44 change, retainer 14 of flexible gear 18 remains engaged in groove 24 of output gear 16 to prevent flexible gear 18 from becoming off-centered. The flexible gear 18 is configured such that, in the elliptical orientation, two portions of an outer circumferential surface 24a of the retainer 24 contact the outer circumferential surface 50 of the groove 24 and two portions of an inner circumferential surface 24b of the retainer contact the inner circumferential surface 48 of the groove 24. In order to center the flexible gear, the inner circumferential surface 48 of the groove 24 is equal to a minimum diametrical envelope of the flexible gear 18 and the outer circumferential surface 50 of the groove 24 of the output gear 16 is equal to a maximum diametrical envelope of the flexible gear 18.

More specifically, the section of retainer 14 on the portions (for example portions 19A, 19B in FIG. 5a or portions 19C, 19D in FIG. 5b) of flexible gear 18 that are maximally extended contact the outer circumferential surface 50 of the centering feature 23. The section of retainer 14 on the portions (for example portions 19C, 19D in FIG. 5a or portions 19A, 19B in FIG. 5b) of flexible gear 18 that are minimally radially extended contact the inner circumferential surface 48 of the centering feature 23.

Specifically, in the event excessive torque is applied to the gearbox control shaft, the interaction between retainer 14 and groove 24 can prevent ratcheting that can cause the flexible gear 18 to become off-centered and result in the teeth 22 becoming jammed on one side with those of the output gear 16. Providing the output gear 16 with the centering feature 23 in the form of groove 24 can thus prevent sticking/jamming of flexible gear 18 during use by preventing the flexible gear 18 from becoming off centered.

A method of constructing camshaft phaser assembly 10 can include coupling the output gear 16 to the sprocket 12, which can include inserting the output gear 16 inside of the sprocket 12. The method also includes installing the flexible gear 18 inside of the output gear 16 with teeth 22 of the flexible gear 18 received inside of teeth 44 of the output gear 16; and then installing the wave generator 20 inside of the output gear 16. The installing the flexible gear 18 inside of the output gear 16 includes installing the cylindrical section of the flexible gear inside of the cylindrical section of the output gear, and inserting the retainer 14 into the centering feature 23 of the output gear 16 to center the flexible gear 18 inside of the output gear 16. The inserting of the retainer 14 into the centering feature 23 (with small clearances to allow the flexible gear 18 to move relatively to the output gear 16) can include moving the retainer 14 towards the radially extending surface 52 defining the groove 24. The method can further include non-rotatably connecting the flexible gear 18 to the sprocket 12 via fasteners 26, specifically by fastening the disc section to the sprocket. In an example embodiment, after construction of the camshaft phaser assembly 10, the retainer 14 does not contact the inner circumferential surface 48 and the outer circumferential surface 50. The retainer 14 contacts the inner circumferential surface 48 and the outer circumferential surface 50 during a high torque condition during usage of the camshaft phaser assembly 10.

REFERENCE NUMERALS 10 camshaft phaser assembly
12 sprocket
12a cup-shaped section
14 retainer
16 output gear
18 flexible gear
19 outer circumference
19A portions
19B portions
19C portions
19D portions
19a portions
19b portions
19c portions
19d portions
20 wave generator
22 teeth
23 centering feature
24 groove
24a outer circumferential surface
24b inner circumferential surface
26 fasteners
28 wave generator cover
30 spacer ring
32 rotor
34 plurality of balls
36 cylindrical section
38 disc section
40 axial edge
42 cylindrical section
44 teeth
46 disc section
46a radially extending surface
48 inner circumferential surface
50 outer circumferential surface
52 radially extending surface

What is claimed is:

1. A camshaft phaser assembly configured for phasing a camshaft and a crankshaft with respect to each other, the camshaft phaser assembly comprising:
   a sprocket for receiving torque from the crankshaft;
   an output gear configured for driving the camshaft;
   a flexible gear deformable into an elliptical orientation for engaging the output gear to transmit torque from the sprocket to the output gear; and
   a wave generator for deforming the flexible gear into the elliptical orientation;
   the flexible gear radially disposed about the wave generator and including an inner circumferential surface in contact with an outer race of the wave generator, the flexible gear including teeth for engaging the output gear in the elliptical orientation and a retainer at an axial end of the flexible gear, the output gear including a centering feature configured for contacting the retainer to center the flexible gear in the elliptical orientation inside of the output gear.

2. The camshaft phaser assembly as recited in claim 1, wherein the flexible gear includes a cylindrical section including the teeth and the retainer.

3. The camshaft phaser assembly as recited in claim 2, wherein the retainer forms a rim of a first end of the cylindrical section.

4. The camshaft phaser assembly as recited in claim 2, wherein the flexible gear further includes a disc section at a second end of the cylindrical section extending radially away from the cylindrical section.

5. The camshaft phaser assembly as recited in claim 1, wherein the centering feature is defined by walls of a groove formed in the output gear.

6. The camshaft phaser assembly as recited in claim 5, wherein the groove is defined by an axially extending inner circumferential surface, an axially extending outer circumferential surface and a radially extending surface extending from the inner circumferential surface to the outer circumferential surface.

7. The camshaft phaser assembly as recited in claim 6, wherein an axial edge of the retainer directly faces the radially extending surface of the groove.

8. The camshaft phaser assembly as recited in claim 6, wherein the flexible gear is configured such that, in the elliptical orientation, two portions of the outer circumferential surface of the retainer contact the outer circumferential surface of the groove and two portions of the inner circumferential surface of the retainer contact the inner circumferential surface of the groove.

9. The camshaft phaser assembly as recited in claim 6, wherein the inner circumferential surface and the outer circumferential surface taper radially away from each other while extending axially away from the radially extending surface.

10. The camshaft phaser assembly as recited in claim 1, wherein the output gear includes a cylindrical section including a plurality of teeth on an inner circumferential surface thereof, some of the teeth of the output gear engaging some of the teeth of the flexible gear in the elliptical orientation.

11. The camshaft phaser assembly as recited in claim 10, wherein the output gear includes a disc section extending radially inward from the cylindrical section, the centering feature being on the disc section.

12. The camshaft phaser assembly as recited in claim 11, wherein the centering feature is a groove formed in a radially outer extent of the disc section.

13. The camshaft phaser assembly as recited in claim 1, wherein the retainer is ring-shaped.

14. A method of constructing a camshaft phaser assembly configured for phasing a camshaft and a crankshaft with respect to each other, the method comprising:
coupling an output gear to a sprocket;
installing a flexible gear inside of the output gear with teeth of the flexible gear received inside of teeth of the output gear; and
installing a wave generator inside of the output gear, the flexible gear being deformable by the wave generator into an elliptical orientation in which some of the teeth of the flexible gear engage some of the teeth of the output gear to transmit torque from the sprocket to the output gear,
the flexible gear including a retainer extending axially away from the teeth,
the installing of the flexible gear inside of the output gear including inserting a retainer defining a first axial end of the flexible gear into a centering feature of the output gear to center the flexible gear inside of the output gear in the elliptical orientation.

15. The method as recited in claim 14 wherein the coupling of the output gear to the sprocket includes inserting the output gear inside of the sprocket, the output gear configured for being connected to the camshaft.

16. The method as recited in claim 14 further comprising non-rotatably connecting the flexible gear to the sprocket.

17. The method as recited in claim 16 wherein the flexible gear includes a cylindrical section including the teeth and the retainer, and a disc section at a second axial end of the cylindrical section extending radially away from the cylindrical section,
the non-rotatably connecting of the flexible gear to the output gear including fastening the disc section to the sprocket.

18. The method as recited in claim 14 wherein the centering feature is a groove formed in a radially extending surface of the output gear, the groove being defined by an axially extending inner circumferential surface, an axially extending outer circumferential surface and a radially extending surface extending from the inner circumferential surface to the outer circumferential surface,
the inserting of the retainer into the centering feature including moving the retainer toward the radially extending surface defining the groove.

19. The method as recited in claim 14, wherein the flexible gear includes a cylindrical section including the teeth and the retainer, and a disc section at a second end of the cylindrical section extending radially away from the cylindrical section,
wherein the output gear includes a cylindrical section including the teeth on an inner circumferential surface thereof, and a disc section extending radially inward from the cylindrical section, the centering feature being on the disc section,
the installing of the flexible gear inside of the output gear including installing the cylindrical section of the flexible gear inside of the cylindrical section of the output gear.

20. The method as recited in claim 19, wherein the centering feature is a groove formed in a radially outer extent of the disc section.

* * * * *